Patented Nov. 7, 1950

2,529,344

UNITED STATES PATENT OFFICE 2,529,344

COMPOSITION FOR IMPARTING RUST-INHIBITING FINISH TO IRON ARTICLES

Adolph W. Machlet, Elizabeth, N. J.

No Drawing. Application January 11, 1949,
Serial No. 70,379

1 Claim. (Cl. 106—1)

This invention is concerned with an agent effective for use in so treating articles manufactured from iron or alloys thereof as to impart thereto a finish or coating capable of inhibiting the formation of rust or discoloration resulting from exposure to the atmosphere.

A primary objective is to render available, for industrial usage by manufacturers of such articles, a material in the form of fine granules with which the articles may be admixed and subjected for a limited period to temperatures incapable of impairing the physical properties imparted to such articles during the normal course of their manufacture, and yet which will bestow upon them an attractive and durable finish.

Another object is to afford the manufacturer a medium or agent which can be used without resort to special equipment such as is necessary in wet electro-plating or in certain dry methods which engender excessive fuming from which the workmen must be protected.

In the usage of the material herein proposed, only the simplest aparatus is required, and no undue amounts of fumes are liberated in the room, and the articles come out in dry condition and require no apparatus for subsequent washing and drying preparatory to shipment or storage.

Another primary aim has been so to compose the treating agent that it may be made available in large amounts at an exceedingly low cost. The chemicals required for electro-plating are not only costly but likewise are not always available on the market in the necessary quantities. So also the supply of such metals as zinc has become greatly restricted. Natural ores require to be mined, crushed and otherwise treated; all of which entails much expense.

I have discovered, however, that a by-product from the chemical reduction of aluminum from certain alumina-bearing ores can be successfully employed as an ingredient of my material. This by-product is discarded as waste heretofore quite useless for any usage, and is known as "red-mud" and can be had at no other cost than cartage in very great and ever-increasing quantities. The ores from which it originated have been finely crushed to adapt them for the extraction, so that, save for a certain content of moisture, the red-mud is essentially pulverulent and its adaptation for my usage involves no costs in crushing. By red-mud, I mean the residue well known as such in the industry by those familiar with the production of aluminum and defined as the residue from the treatment of bauxite by caustic soda, as set forth in various reference publications, to wit, "Metals Handbook" issued by American Society for Metals, and "Aluminum * Its Story" published by the Aluminum Company of America and stipulated in my co-pending application, filed of even date herewith, Ser. No. 70,378, and composed as follows:

An analysis of this red-mud shows the following:

|  | Per Cent |
|---|---|
| Alumina | 18 to 25 |
| Ferric oxide | 13 to 20 |
| Titanium oxide | 7 to 12 |
| Silica | 10 to 15 |
| Lime | 10 to 18 |
| Soda | 4 to 7 |
| Ignition loss | 14 to 17 |

This material, preferably but not necessarily pre-dried, is admixed with charcoal in the proportion of about 10 pounds of red-mud to four pounds of charcoal, half of which may be coarsely and the other half finely divided. This composition is stable and may be stored in bulk and distributed to users ready at any time for usage without any possibility of deterioration.

The users thereof will employ it in imparting a superior and durable finish or coating to articles of their manufacture by inter-mingling it with them and heating to a temperature ranging from 850° to 1600° F., and cooling without access to air according to the method of treatment of my copending application Ser. No. 70,378, filed Jan. 11, 1949.

I claim:

A pulverulent mixture for imparting a rust-inhibiting finsh to articles of manufacture composed or iron or alloys thereof which consists of about four parts of charcoal and about ten parts of the pulverulent by-product, predried, resulting from the extraction of aluminum from bauxite, said by-product being composed of about 20% alumina, about 18% ferric oxide, about 10% titanium oxide, about 12% silica and about 15% lime and about 6% soda.

ADOLPH W. MACHLET.

REFERENCES CITED

The following references are of record in the file of this patent:

UNITED STATES PATENTS

| Number | Name | Date |
|---|---|---|
| 379,438 | Baldwin | Mar. 13, 1888 |